US011862787B2

(12) United States Patent
Kimura et al.

(10) Patent No.: US 11,862,787 B2
(45) Date of Patent: Jan. 2, 2024

(54) NEGATIVE ELECTRODE ACTIVE MATERIAL FOR LITHIUM-ION BATTERY, NEGATIVE ELECTRODE FOR LITHIUM-ION BATTERY AND LITHIUM-ION BATTERY

(71) Applicant: DAIDO STEEL CO., LTD., Nagoya (JP)

(72) Inventors: Yuta Kimura, Nagoya (JP); Hiroyuki Miyamoto, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 102 days.

(21) Appl. No.: 16/777,666

(22) Filed: Jan. 30, 2020

(65) Prior Publication Data

US 2020/0251723 A1 Aug. 6, 2020

(30) Foreign Application Priority Data

Feb. 6, 2019 (JP) .................................. 2019-019856
Jan. 20, 2020 (JP) .................................. 2020-006710

(51) Int. Cl.
*H01M 4/36* (2006.01)
*H01M 10/0525* (2010.01)
*H01M 4/38* (2006.01)
*H01M 4/02* (2006.01)

(52) U.S. Cl.
CPC .......... *H01M 4/364* (2013.01); *H01M 4/386* (2013.01); *H01M 4/387* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2013/0084498 A1* 4/2013 Kimura ................. H01M 4/387
 429/217
2014/0106230 A1* 4/2014 Kim ...................... H01M 4/583
 429/231.8

FOREIGN PATENT DOCUMENTS

| CN | 103035892 A | 4/2013 |
| JP | 2013-084549 A | 5/2013 |
| JP | 2017-224499 A | 12/2017 |

OTHER PUBLICATIONS

Korean Office Action, dated Apr. 5, 2021, in Korean Application No. 10-2020-0013354 and English Tanslation thereof.
Chinese Office Action dated Sep. 23, 2022, in corresponding Chinese Patent Application No. 202010080510.X, with an English translation thereof.

* cited by examiner

*Primary Examiner* — Zhongqing Wei
(74) *Attorney, Agent, or Firm* — MCGINN I.P. LAW GROUP, PLLC

(57) ABSTRACT

The present invention relates to a negative electrode active material for a lithium-ion battery, containing a Si phase, a Si—Zr compound phase, and a Sn—X compound phase in which X is at least one element selected from the group consisting of Cu, Ti, Co, Fe, Ni, and Zr, the Sn—X compound phase has a proportion of 0.1 mass % to 18 mass % to the whole, and the Si phase has a proportion of 10 mass % to 80 mass % to the whole.

12 Claims, 1 Drawing Sheet

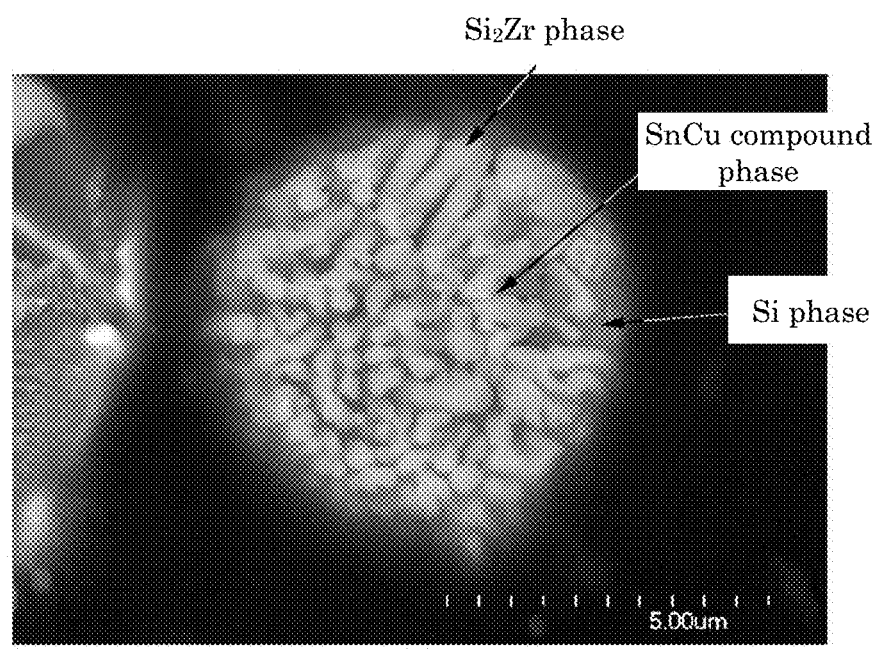

NEGATIVE ELECTRODE ACTIVE MATERIAL FOR LITHIUM-ION BATTERY, NEGATIVE ELECTRODE FOR LITHIUM-ION BATTERY AND LITHIUM-ION BATTERY

TECHNICAL FIELD

The present invention relates to a negative electrode active material for a lithium-ion battery, negative electrode for lithium-ion battery and lithium-ion battery.

BACKGROUND

A lithium-ion battery has an advantage of being able to be miniaturized at a high capacity and a high voltage, and is widely used as a power source of a mobile phone, a notebook computer or the like. In recent years, the lithium-ion battery also attracts much attention as a power source for a power application for an electric automobile, a hybrid automobile and the like, and development thereof has been actively promoted.

In the lithium-ion battery, lithium-ions (hereinafter also referred to as Li-ions) move between a positive electrode and a negative electrode to cause charging and discharging. The Li-ions are stored in a negative electrode active material on a negative electrode side during charging, and Li-ions are released from the negative electrode active material during discharging.

Conventionally, lithium cobaltate ($LiCoO_2$) is generally used as an active material on a positive electrode side, and graphite is widely used as the negative electrode active material. However, graphite of the negative electrode active material has a theoretical capacity of only 372 mAh/g and thus, a new negative electrode active material having a higher capacity is desired. Therefore, recently, as an alternate material of a carbon-based negative electrode active material, a metal material such as Si (a theoretical capacity of Si is 4,198 mAh/g) which can be expected to have a high capacity has been actively studied.

However, since Si stores the Li-ions by an alloying reaction with Li, large volume expansion and contraction occur accompanying with the storing and releasing of the Li-ions. Therefore, in the case where the negative electrode active material is formed of Si alone, Si particles tend to crack or peel off from a current collector by the expansion and contraction stress, so that there is a problem that cycle characteristics which are characteristics of capacity retention when charging and discharging are repeated deteriorate.

In order to solve such a problem in the negative electrode active material using Si, various proposals of alloying Si have been made (e.g., see Patent Literature 1 below). In the negative electrode active material containing Si and an element alloyed with Si, a Si compound phase is formed around a Si phase and acts so as to absorb the expansion stress during expansion of the Si phase, so that cracking and collapse of the Si phase can be prevented, and cycle characteristics can be improved.

On the other hand, miniaturization of Si in the negative electrode active material is also known as a method effective for improving the cycle characteristics. However, in the negative electrode active material obtained by alloying Si, Li-storage ability of the Si compound phase, that is, a Li path characteristic is not sufficiently high. Therefore, in the case of miniaturization, Li-ions diffuse and move in the Si compound phase to make it difficult to reach the Si phase, and as a result, there is a problem that an initial discharging capacity or initial coulombic efficiency decreases.

Patent Literature 1: JP-A-2017-224499

SUMMARY

In view of the above circumstances, an object of the present invention is to provide a negative electrode active material for a lithium-ion battery in which cycle characteristics, an initial discharging capacity, and initial coulombic efficiency are improved in good balance.

The present invention provides a negative electrode active material for a lithium-ion battery, containing a Si phase, a Si—Zr compound phase, and a Sn—X compound phase in which the element X is at least one element selected from the group consisting of Cu, Ti, Co, Fe, Ni, and Zr, in which the Sn—X compound phase has a proportion of 0.1 mass % to 18 mass % to the whole, and the Si phase has a proportion of 10 mass % to 80 mass % to the whole.

In a Si—Zr alloy, a Si—Zr compound phase forms into an island form and a Si phase forms into a sea form in a process of cooling and solidifying a molten alloy. Since many parts of the sea-form Si phase are located on an outermost surface, a stress applied to the Si—Zr compound phase is small during expansion of the Si phase, and collapse of particles can be prevented. In addition, since the Si—Zr compound phase disposed in an island form does not expand, it can play a role of a frame material which maintains a structure of the particles, to prevent the collapse of particles more effectively. Therefore, the capacity retention characteristics when charging and discharging are repeated, that is, cycle characteristics can be improved.

Furthermore, the negative electrode active material for a lithium-ion battery according to the present invention contains the Sn—X compound phase. The Sn—X compound formed of Sn and at least one element selected from the group consisting of Cu, Ti, Co, Fe, Ni, and Zr has a higher Li ion diffusivity than the Si—Zr compound. Therefore, it is easy to ensure a diffusion path of Li-ions by dispersing the Sn—X compound together with the Si—Zr compound in the alloy particles. Therefore, even when the cycle characteristics are improved by miniaturizing the Si phase, it is possible to prevent reductions in an initial discharging capacity and in an initial coulomb efficiency.

Here, in the present invention, a proportion of the Sn—X compound phase to the whole is 0.1 mass % to 18 mass %. Since the Sn—X compound phase expands due to a reaction with Li-ions although the degree of expansion is smaller than a Sn simple substance, in the case where the proportion of the Sn—X compound phase is excessively high, the cycle characteristics may deteriorate. Therefore, in the present invention, the proportion of the Sn—X compound phase is set to 0.1 mass % to 18 mass %. The proportion of the Sn—X compound phase is preferably 1 mass % to 10 mass %.

In the present invention, a proportion of the Si phase is set to 10 mass % to 80 mass %. In the case where the proportion of the Si phase which stores Li-ions is small, the initial discharging capacity decreases, and conversely, in the case where the proportion of the Si phase is large, an amount of a Si compound phase relatively decreases, and the cycle characteristics may deteriorate. Therefore, in the present invention, the proportion of the Si phase is set in a range of 10 mass % to 80 mass %. The proportion of the Si phase is preferably 20 mass % to 65 mass %.

Here, the Si phase is preferably miniaturized to have a maximum size of 500 nm or less.

According to the present invention as described above, it is possible to provide a negative electrode active material for a lithium-ion battery in which cycle characteristics, initial discharging capacity, and initial coulombic efficiency are improved in good balance.

BRIEF DESCRIPTION OF DRAWINGS

FIG. 1 is a microstructural photograph of a negative electrode active material according to Example 2 taken with a scanning electron microscope.

EMBODIMENTS

Next, a negative electrode active material for a lithium-ion battery (hereinafter, sometimes simply referred to as a negative electrode active material) according to an embodiment of the present invention, a lithium-ion battery (hereinafter, sometimes simply referred to as a battery) using the negative electrode active material in a negative electrode will be specifically described.

1. Negative Electrode Active Material

The negative electrode active material of the present embodiment is made of a Si—Zr—Sn—X alloy, and contains a Si phase, a Si—Zr compound phase, and a Sn—X compound phase. Here, an element X is at least one element selected from the group consisting of Cu, Ti, Co, Fe, Ni, and Zr. The negative electrode active material of the present embodiment does not contain any other elements than these main elements (Si, Zr, Sn and elements X) except for elements contained inevitably.

The Si phase is a phase mainly containing Si. In view of increasing a Li storage amount and the like, it is preferable to consist of a single phase of Si. However, inevitable impurities may be contained in the Si phase.

Although the Si—Zr compound phase mainly contains $Si_2Zr$, other Zr silicide phases ($Si_4Zr$, $Si_3Zr_2$, $SisZr_4$, $SiZr$, $SiZr_2$, etc.) may be inevitably contained. A shape of the Si—Zr compound phase dispersed in a matrix phase (Si phase) is not particularly limited, but a flat shape in which a contact area with the Si phase increases is desirable in view of preventing expansion and contraction of the Si phase by the Si—Zr compound phase.

On the other hand, the Sn—X compound phase is composed of a compound of Sn and at least one element selected from the group consisting of Cu, Ti, Co, Fe, Ni, and Zr. The Sn—X compound has a higher Li ion diffusivity than the Si—Zr compound. When Li reactivity is compared, the Si—Zr compound is about 100 mAh/g and a Sn simple substance is about 930 mAh/g, while the Sn—X compound is 150 mAh/g to 600 mAh/g.

That is, in the negative electrode active material of the present embodiment, a diffusion path of Li-ions is easily ensured through the Sn—X compound phase. On the other hand, the Sn—X compound phase has a smaller degree of expansion due to a reaction with Li-ions as compared with Sn that has a higher reactivity with Li-ions. Therefore, adverse effects on cycle characteristics due to formation of the Sn—X compound can also be reduced. The Sn—X compound phase may include only one kind of compound, and it is also possible to include two or more kinds of compounds, for example, a Sn—Zr compound and a Sn—Cu compound. As described above, the negative electrode active material of the present embodiment is composed of Si, a Si—Zr compound, and a Sn—X compound. However, the negative electrode active material of the present embodiment may contain, as an impurity, Sn in a form of a simple substance, which is in a non-compound form, in a proportion of up to 5 mass % to the whole.

A form of the negative electrode active material is not particularly limited. Specifically, examples of the form include a flake form, a powder form and the like. The powder form is preferable in view of being easily applied to production of the negative electrode. The negative electrode active material of the present embodiment may be dispersed in an appropriate solvent.

The negative electrode active material of the present embodiment can be produced by a method containing a step of forming a quenched alloy by quenching a molten alloy having a predetermined chemical composition. In the case where the obtained quenched alloy is not in a powder form or is desired to be further reduced in diameter, a step of pulverizing the quenched alloy by a suitable pulverizing means to get a powder form may be added. If necessary, a step of classifying the obtained quenched alloy to adjust it into an appropriate particle size, and the like may be added. It is also possible to produce the negative electrode active material of the present embodiment by separately preparing Si, the Si—Zr compound, and the Sn—X compound and mixing them.

A particle diameter (average particle diameter (d50)) of the active material is desirably controlled in a range of 1 μm to 20 μm. The average particle diameter (d50) in the present invention is a volume basis and can be measured by using a laser diffraction and scattering particle size distribution measurement device (Microtrac MT3000).

Even in the case where a Si alloy is used as the active material, volume expansion and contraction of the active material itself occurs accompanying the charging and discharging reaction, so that a stress is generated in a binder layer formed by binding the negative electrode active material with a binder, that is, a conductive film. In this case, when the binder cannot withstand the stress, the binder is collapsed, and as a result, the conductive film is peeled off from a current collector, resulting in a decrease in conductivity in an electrode to decrease cycle characteristics during charging and discharging. However, in the case where an average particle diameter of the active material is adjusted to a fine particle of 1 μm to 20 μm, a contact area of the active material with the binder is increased since the active material is fine particles, so that the collapse of the binder is favorably prevented, and as a result, the cycle characteristics can be improved.

In the above-described production method, the molten alloy can be obtained, for example, by weighing each raw material so as to have a predetermined chemical composition, and dissolving each weighed raw material by using a dissolving means such as an arc furnace, a high-frequency induction furnace, and a heating furnace.

Specific examples of the method of quenching the molten alloy include liquid quenching methods such as a roll-quenching method (a single-roll-quenching method, a twin-roll-quenching method, etc.) and an atomization method (a gas atomization method, a water atomization method, a centrifugal atomization method, etc.). It is particularly desirable to use a roll-quenching method having a high cooling speed.

Here, in the case where the negative electrode active material of the present embodiment is produced by using a molten alloy containing Si and Zr, the following method is specifically preferable.

That is, in the case where a roll-quenching method is applied, the molten alloy, which is tapped in a chamber such as a quenching and recovery chamber to flow down continuously (in a rod shape), is cooled on a rotation roll (which may be made of a material such as Cu or Fe, and a roll surface of which may be plated) which rotates at a circumferential speed of about 10 m/s to 100 m/s. The molten alloy is made into foil or a foil piece by being cooled on the roll surface. In this case, the alloy material is pulverized by an appropriate pulverization means such as a ball mill, a disk mill, a coffee mill, and mortar pulverization, and then classified or further finely pulverized as necessary to obtain the powdery negative electrode active material.

On the other hand, in the case where an atomization method is applied, gas such as $N_2$, Ar, He, or the like is sprayed at a high pressure (e.g., 1 MPa to 10 MPa) to the molten alloy, which is tapped in a spray chamber to flow down continuously (in a rod shape), to cool the molten alloy while pulverizing. The cooled molten alloy approaches a spherical shape while falling freely in semi-molten state in the spray chamber, and the powdery negative electrode active material is obtained. Furthermore, in view of improving a cooling effect, high-pressure water may be sprayed instead of the gas.

2. Battery

The battery of the present embodiment is configured by using a negative electrode containing the negative electrode active material of the present embodiment.

The negative electrode includes a conductive substrate and a conductive film laminated on a surface of the conductive substrate. The conductive film contains at least the above-described negative electrode active material in a binder. In addition, the conductive film may also contain a conductive auxiliary as necessary. In the case where the conductive auxiliary is contained, it is easy to secure a conductive path of electrons.

Besides, the conductive film may contain a frame material if necessary. In the case where the frame material is contained, expansion and contraction of the negative electrode during charging and discharging are easily prevented, and collapse of the negative electrode can be prevented, so that cycle characteristics can be further improved.

The conductive substrate functions as a current collector. Examples of the material thereof include Cu, a Cu alloy, Ni, a Ni alloy, Fe, and a Fe alloy. Cu and the Cu alloy are preferable. Specific examples of a form of the conductive substrate include a foil form and a plate form. The foil form is preferable in view of reducing a volume of the battery and improving a degree of freedom of shape.

As a material of the binder, use can be suitable made of a polyvinylidene fluoride (PVdF) resin, a fluorine resin such as polytetrafluoroethylene, a polyvinyl alcohol resin, a polyimide resin, a polyamide resin, a polyamide-imide resin, styrene-butadiene rubber (SBR), polyacrylic acid, and the like. These can be used alone or in combination of two or more thereof. Among them, the polyimide resin is particularly preferable since it has a high mechanical strength, can well withstand volume expansion of the active material, and can well prevent detachment of the conductive film from the current collector caused by destruction of the binder.

Examples of the conductive auxiliary include carbon black such as ketjen black, acetylene black, and furnace black, graphite, carbon nanotubes, and fullerene. These may be used alone or in combination of two or more thereof. Among them, ketjen black, acetylene black or the like can be suitably used in view of easily ensuring electron conductivity.

A content of the conductive auxiliary is preferably in a range of 0 to 30 parts by mass and more preferably 4 to 13 parts by mass with respect to 100 parts by mass of the negative electrode active material in view of a degree of improvement of conductivity, an electrode capacity and the like. An average particle diameter (d50) of the conductive auxiliary is preferably 10 nm to 1 µm and more preferably 20 nm to 50 nm in view of dispersibility, ease of handling and the like.

As the frame material, use can be suitably made of a material which does not expand and contract or expands and contracts little, during charging and discharging. Examples thereof include graphite, alumina, calcia, zirconia, and activated carbon. These may be used alone or in combination of two or more thereof. Among them, graphite or the like can be suitably used in view of conductivity, a degree of Li activation and the like.

A content of the frame material is preferably in a range of 10 to 400 parts by mass and more preferably 43 to 100 parts by mass with respect to 100 parts by mass of the negative electrode active material in view of improvement of cycle characteristics, and the like. An average particle diameter of the frame material is preferably 10 µm to 50 µm and more preferably 20 µm to 30 µm in view of functionality as a frame material, control of electrode film thickness and the like. The average particle diameter of the frame material is a value measured by using a laser diffraction and scattering particle size distribution measurement device.

The negative electrode can be produced, for example, by adding a necessary amount of the negative electrode active material and, if necessary, the conductive auxiliary and the frame material in a binder dissolved in a suitable solvent, to obtain a paste, coating the obtained paste on a surface of the conductive substrate, drying, and applying pressure, heat treatment or the like as necessary.

In the case where the negative electrode is used to form a lithium-ion battery, a positive electrode, an electrolyte, a separator, and the like, which are basic constituent elements of the battery other than the negative electrode, are not particularly limited.

Specific examples of the positive electrode include those obtained by forming a layer containing a positive electrode active material such as $LiCoO_2$, $LiNiO_2$, $LiFePO_4$, and $LiMnO_2$ on a surface of the current collector such as aluminum foil.

Specific examples of the electrolyte include an electrolytic solution obtained by dissolving a lithium salt in a non-aqueous solvent. In addition, an electrolyte obtained by dissolving a lithium salt in a polymer, a polymer solid electrolyte obtained by impregnating a polymer with the above-described electrolytic solution, and the like can also be used.

Specific examples of the non-aqueous solvent include ethylene carbonate, propylene carbonate, butylene carbonate, dimethyl carbonate, diethyl carbonate, and methyl ethyl carbonate. These may be used alone or in combination of two or more thereof.

Specific examples of the lithium salt can include $LiPF_6$, $LiBF_4$, $LiClO_4$, $LiCF_3SO_3$, and $LiAsF_6$. These may be used alone or in combination of two or more thereof.

Furthermore, other battery constituent elements such as a separator, a can (battery case) and a gasket may be contained, and any of these can be combined as appropriate to form a battery as long as they are usually employed in a lithium-ion battery.

A shape of the battery is not particularly limited, may be any shape such as a cylindrical shape, a square shape or a coin shape, and can be appropriately selected depending on a specific application thereof.

EXAMPLES

Hereinafter, the present invention will be described more specifically by using Examples. Here, unit % of an alloy composition is mass % unless otherwise specified.

1. Production of Negative Electrode Active Material

Each raw material was weighed so as to have the alloy composition shown in the following Table 1. Each weighed raw material was heated and dissolved by using a high-frequency induction furnace to prepare molten alloys. Each of the obtained molten alloys was quenched by using a single-roll-quenching method to obtain quenched alloy ribbons. A roll circumferential speed was 42 m/s, and a nozzle distance was 3 mm. Each of the obtained quenched alloy ribbons was mechanically pulverized by using a mortar to produce powdery negative electrode active materials. Furthermore, miniaturization by using a planetary ball mill was performed so as to obtain a target size of the Si phase as necessary.

TABLE 1

| | | Chemical components (mass %) | | | | | | |
|---|---|---|---|---|---|---|---|---|
| | | Si | Zr | Sn | Cu | Ti | Co | Fe | Target constituent phases |
| Examples | 1 | 55.6 | 39.4 | 3.1 | 1.9 | — | — | — | 95{33[Si]-67[$Si_2Zr$]}-5[$Sn_5Cu_6$] |
| | 2 | 55.6 | 39.4 | 3.1 | 1.9 | — | — | — | 95{33[Si]-67[$Si_2Zr$]}-5[$Sn_5Cu_6$] |
| | 3 | 55.6 | 39.4 | 1.9 | 3.1 | — | — | — | 95{33[Si]-67[$Si_2Zr$]}-5[$SnCu_3$] |
| | 4 | 55.6 | 39.4 | 3.4 | — | 1.6 | — | — | 95{33[Si]-67[$Si_2Zr$]}-5[$Sn_5Ti_6$] |
| | 5 | 55.6 | 39.4 | 4.0 | — | — | 1.0 | — | 95{33[Si]-67[$Si_2Zr$]}-5[$Sn_2Co$] |
| | 6 | 55.6 | 39.4 | 3.3 | — | — | 1.7 | — | 95{33[Si]-67[$Si_2Zr$]}-5[SnCo] |
| | 7 | 55.6 | 40.8 | 3.6 | — | — | — | — | 95{33[Si]-67[$Si_2Zr$]}-5[$Sn_2Zr$] |
| | 8 | 55.6 | 42.2 | 2.2 | — | — | — | — | 95{33[Si]-67[$Si_2Zr$]}-5[$Sn_3Zr_5$] |
| | 9 | 59.7 | 35.3 | 3.1 | 1.9 | — | — | — | 95{40[Si]-60[$Si_2Zr$]}-5[$Sn_5Cu_6$] |
| | 10 | 71.5 | 23.5 | 3.1 | 1.9 | — | — | — | 95{60[Si]-40[$Si_2Zr$]}-5[$Sn_5Cu_6$] |
| | 11 | 77.4 | 17.6 | 3.1 | 1.9 | — | — | — | 95{70[Si]-30[$Si_2Zr$]}-5[$Sn_5Cu_6$] |
| | 12 | 48.0 | 47.0 | 3.1 | 1.9 | — | — | — | 95{20[Si]-80[$Si_2Zr$]}-5[$Sn_5Cu_6$] |
| | 13 | 49.7 | 35.3 | 5.7 | 9.3 | — | — | — | 85{33[Si]-67[$Si_2Zr$]}-15[$Sn_5Cu_6$] |
| | 14 | 55.9 | 39.6 | 0.2 | 0.3 | — | — | — | 95.5{33[Si]-67[$Si_2Zr$]}-0.5[$Sn_5Cu_6$] |
| Comparative Examples | 1 | 58.5 | 41.5 | — | — | — | — | — | 33[Si]-67[$Si_2Zr$] |
| | 2 | 62.9 | 37.1 | — | — | — | — | — | 40[Si]-60[$Si_2Zr$] |
| | 3 | 75.2 | 24.8 | — | — | — | — | — | 60[Si]-40[$Si_2Zr$] |
| | 4 | 58.5 | 41.5 | — | — | — | — | — | 33[Si]-67[$Si_2Zr$] |
| | 5 | 55.6 | 39.4 | 5.0 | — | — | — | — | 95{33[Si]-67[$Si_2Zr$]}-5[Sn] |
| | 6 | 63.3 | — | 3.1 | 1.9 | — | — | 31.7 | 95{33[Si]-67[$Si_2Fe$]}-5[$Sn_5Cu_6$] |

2. Structure Observation of Negative Electrode Active Material, and the Like

Structure observation was performed on negative electrode active materials according to Examples and Comparative Examples by a scanning electron microscope (SEM). Analysis by XRD (X-ray diffraction) was also performed together to confirm whether negative electrode active materials were composed of phases of Si, a Si—Zr compound and a Sn compound. Types of the confirmed compound phase are as shown in the following Table 2. In the XRD analysis, the measurement was performed on an angle range of 120° to 20° by using a Co bulb.

TABLE 2

| | | Si phase amount (mass %) | Si phase size (nm) | Si compund phase | Si—X compound phase amount (mass %) | Si—X Compound phase | Initial discharging capacity [mAh/g] | Initial coulomb efficiency (%) | Capacity retention rate [%] | Synthetic judgment |
|---|---|---|---|---|---|---|---|---|---|---|
| Examples | 1 | 31.3 | 300 | $Si_2Zr$ | 5 | $Sn_5Cu_6$ | A (1,152) | A (78) | A (80) | A |
| | 2 | 31.3 | 1,000 | $Si_2Zr$ | 5 | $Sn_5Cu_6$ | A (1,200) | A (80) | B (65) | B |
| | 3 | 31.3 | 300 | $Si_2Zr$ | 5 | $SnCu_3$ | A (1,102) | A (77.8) | A (78) | A |
| | 4 | 31.3 | 300 | $Si_2Zr$ | 5 | $Sn_5Ti_6$ | A (1,143) | A (77.2) | A (75) | A |
| | 5 | 31.3 | 300 | $Si_2Zr$ | 5 | $Sn_2Co$ | A (1,109) | A (77.4) | A (73) | A |
| | 6 | 31.3 | 300 | $Si_2Zr$ | 5 | SnCo | A (1,094) | A (77) | A (76) | A |
| | 7 | 31.3 | 300 | $Si_2Zr$ | 5 | $Sn_2Zr$ | A (1,143) | A (77) | A (74) | A |
| | 8 | 31.3 | 300 | $Si_2Zr$ | 5 | $Sn_3Zr_5$ | A (1,112) | A (76.8) | A (74) | A |
| | 9 | 38.0 | 400 | $Si_2Zr$ | 5 | $Sn_5Cu_6$ | A (1,411) | A (81.2) | A (73) | A |
| | 10 | 57.0 | 500 | $Si_2Zr$ | 5 | $Sn_5Cu_6$ | A (1,754) | A (83.2) | A (70) | A |
| | 11 | 66.5 | 500 | $Si_2Zr$ | 5 | $Sn_5Cu_6$ | A (2,021) | A (87) | B (66) | B |
| | 12 | 19.0 | 200 | $Si_2Zr$ | 5 | $Sn_5Cu_6$ | B (556) | A (71) | A (95) | B |
| | 13 | 28.1 | 300 | $Si_2Zr$ | 15 | $Sn_5Cu_6$ | A (1,194) | A (79.1) | B (66) | B |
| | 14 | 31.5 | 300 | $Si_2Zr$ | 0.5 | $Sn_5Cu_6$ | A (1,084) | B (68) | A (73) | B |
| Comparative Examples | 1 | 33 | 1,000 | $Si_2Zr$ | 0 | None | B (921) | A (77) | B (65) | C |
| | 2 | 40 | 1,000 | $Si_2Zr$ | 0 | None | A (1,100) | A (80) | C (54) | C |
| | 3 | 60 | 500 | $Si_2Zr$ | 0 | None | A (1,800) | A (75) | C (55) | C |
| | 4 | 33 | 300 | $Si_2Zr$ | 0 | None | B (810) | C (62) | A (73) | C |
| | 5 | 31.4 | 300 | $Si_2Zr$ | 5 | Sn | A (1,200) | A (78) | C (58) | C |
| | 6 | 31.4 | 300 | $Si_2Fe$ | 5 | $Sn_5Cu_6$ | A (1,200) | A (78) | C (58) | C |

As a representative example of Examples, a scanning electron micrograph of a negative electrode active material according to Example 2 made of a Si—Zr—Sn—Cu alloy is shown in FIG. 1. It can be found that a large number of flat Si compound phases, which looks gray in the drawing, are dispersed in a matrix phase including a Si phase, which looks black in the drawing. In a process of cooling and solidifying the molten alloy, a Si—Zr compound is crystallized at first, and then Si (Si phase) is crystallized, so that the Si—Zr compound phase is formed in an island form, and the Si phase is formed in a sea form. In FIG. 1, the phase, which is dispersed and looks white, is a Sn—Cu compound phase crystallized after Si.

3. Evaluation of Size of Si Phase

The Si phase was imaged at a magnification of 10,000 by using a SEM. A size of the Si phase was measured from the image. Specifically, five fields of view were imaged, a maximum length of the Si phase in each field of view was measured, and the maximum value was used as the size of the Si phase. In the case where the Si phase spread in a sea form, a connected Si phase was regarded as one Si phase, and the maximum length was measured. The results are shown in Table 2.

4. Calculation of Si Phase Amount and Sn—X Compound Phase Amount

A method of calculating a Si phase amount and a Sn—X compound phase amount shown in Table 2 will be described by taking the case of Example 7 containing Si, Zr, and Sn, as an example.

(1) First, constituent phases are confirmed. In the case of Example 7, Si, $Si_2Zr$, and $Sn_2Zr$ were confirmed as a result of the XRD analysis (see Table 2).

(2) When expressed with a ratio of mass %, $Sn_2Zr$ is 72.3 [Sn]-27.7 [Zr]. Since the whole amount of Sn is present as the Sn compound, the amount of Zr constituting the Sn compound is 3.6×27.7/72.3=1.4 (mass %).

(3) The amount of the remaining Zr 40.8-1.4=39.4 (mass %) corresponds to the amount of Zr constituting the Si compound.

(4) When expressed with a ratio of mass %, $Si_2Zr$ is 38.1 [Si]-61.9 [Zr]. Since the amount of Zr constituting the Si compound is 39.4 (mass %) as in the above (3), the amount of Si constituting the Si compound is 39.4×38.1/61.9=24.3 (mass %).

(5) Therefore, the Si phase amount obtained by subtracting the amount of the compounded Si from the total Si amount can be calculated as 55.6-24.3=31.3 (mass %).

(6) The Sn—X compound ($Sn_2Zr$) phase amount can be calculated as 3.6 (Sn amount)×100/72.3=5.0 (mass %).

5. Evaluation of Negative Electrode Active Material 5.1 Production of Coin-Shape Battery for Charging and Discharging Test First, 100 parts by mass of the respective negative electrode active material, 6 parts by mass of ketjen black (manufactured by Lion Corporation) as a conductive auxiliary, and 19 parts by mass of polyimide (thermoplastic resin) binder as a binding agent were compounded and mixed with N-methyl-2-pyrrolidone (NMP) as a solvent to produce pastes containing the respective negative electrode active material.

The coin-shape half battery was produced as follows. Here, in order to obtain a simple evaluation, an electrode produced by using the negative electrode active material was used as a test electrode, and Li foil was used as a counter electrode. First, the respective paste was applied to a surface of SUS316L foil (thickness: 20 m), which serves as a negative electrode current collector, to be a thickness of 50 µm by using a doctor blade method, and dried to form a negative electrode active material layer. After the formation, the negative electrode active material layer was compressed by roll-pressing. Accordingly, test electrodes according to Examples and Comparative Examples were produced.

Next, the test electrodes according to Examples and Comparative Examples were punched into a disk shape having a diameter of 11 mm and used as the respective test electrode.

Next, Li foil (thickness: 500 µm) was punched into substantially the same shape as the above-mentioned test electrode to produce counter electrodes. $LiPF_6$ was dissolved in a mixed solvent consisting of equal amount of ethylene carbonate (EC) and diethyl carbonate (DEC), to be a concentration of 1 mol/l to prepare a non-aqueous electrolytic solution.

Then, the respective test electrode was housed in a positive electrode can (the test electrode should be a negative electrode in lithium-ion batteries, but in the case where the Li foil is used as a counter electrode, Li foil becomes negative electrode and the test electrode becomes positive electrode), the counter electrode was housed in a negative electrode can, and a separator of a polyolefin microporous membrane was disposed between the test electrode and the counter electrode.

Next, the non-aqueous electrolytic solution was injected into each can, and the negative electrode can and the positive electrode can were swaged and fixed separately.

5.2 Charging and Discharging Test

Constant current charging and discharging of a current value of 0.2 mA was performed in one cycle by using the respective coin-shape battery, and a value obtained by dividing a capacity (mAh) used during Li emission by mass of the active material (g) was taken as an initial discharging capacity Co (mAh/g). A ratio of the discharging capacity to a charging capacity in the charging and discharging cycle was determined by a percentage of discharging capacity/charging capacity to obtain an initial coulombic efficiency (%).

For the measured initial discharging capacity Co, the cases of 1,000 mAh/g or more was evaluated as "A", the cases of 500 mAh/g or more and less than 1,000 mAh/g was evaluated as "B", and the cases of less than 500 mAh/g was evaluated as "C", and the results are shown in Table 2.

For the initial coulombic efficiency, the cases of 70% or more was evaluated as "A", the cases of 65% or more and less than 70% was evaluated as "B", and the cases of less than 65% was evaluated as "C", and the results are shown in Table 2.

In the second and subsequent cycles, the charging and discharging test was performed at a ⅕ C rate (C rate: when an electricity amount Co is required for discharging (charging) an electrode, a current value which discharges (charges) the electricity amount Co in one hour is set to "1 C". "5 C" means that the electricity amount Co is discharged (charged) in 12 minutes, and "⅕ C" means that the electricity amount Co is discharged (charged) in 5 hours.). Then, the cycle characteristics were evaluated by performing the charging/discharging cycle 50 times. Then, a capacity retention ratio (discharging capacity after 50 cycles/initial discharging capacity (charging capacity of first cycle)×100) was determined from the obtained discharging capacities. For the capacity retention rate, the cases of 70% or more was evaluated as "A", the cases of 60% or more and less than 70% was evaluated as "B", and the cases of less than 60% was evaluated as "C", and the results are shown in Table 2.

Synthetic judgment in Table 2 is based on the evaluation results of items of the initial discharging capacity, the initial coulombic efficiency, and the capacity retention ratio.

Here, the cases where all of the items were "A": "A (pass)"

the cases where any one of the items was "B" and the other items were "A": "B (pass)"

the cases where any two or more of the items were "B" or any one or more of the items was "C": "C (failed)"

From the results shown in Table 2 obtained as described above, the followings can be found.

Comparative Examples 1 to 4 are examples including no Sn—X compound phase. In Comparative Examples 2 and 3 in which the Si phase amount is 40% or more, the initial discharging capacity and the initial coulombic efficiency are high, but the capacity retention ratio is low.

In Comparative Example 1 in which the Si phase amount is 33%, the capacity retention ratio is improved, but does not reach a target (70% or more).

In Comparative Example 4 in which a Si size is miniaturized to 300 nm, the capacity retention ratio is high, but the initial discharging capacity and the initial coulombic efficiency decrease. In all of Comparative Examples 1 to 4, the synthetic judgment is "C".

Comparative Example 5 is an example in which an active material is produced by mechanical milling by using a Si—Zr alloy powder and a Sn powder, and a Sn phase having high reactivity with Li-ions is formed instead of a Sn—X compound. Therefore, in Comparative Example 5, the initial discharging capacity and the initial coulombic efficiency are high, but the capacity retention ratio is low, so the synthetic judgment is "C".

Comparative Example 6 is an example in which a Si—Fe compound is formed instead of the Si—Zr compound phase, but the capacity retention ratio is low, so the synthetic judgment is "C". In Comparative Example 6, it is estimated that since a sea-island structure where the Si phase is an island form and the silicide phase is a sea form is formed, stress generated when Si expands is applied to the silicide phase to collapse particles and thus, the cycle characteristics deteriorate.

In contrast, in each Example, it can be found that the synthetic judgment is "A" or "B", and the cycle characteristics, the initial discharging capacity, and the initial coulombic efficiency are improved in good balance. Particularly, in Examples in which the Si phase amount is 20% to 65%, the Si phase size is 500 nm or less, and the Sn—X compound phase amount is 1% to 10%, an excellent evaluation result is obtained.

Although the negative electrode active material for a lithium-ion battery and the lithium-ion battery of the present invention have been described in detail above, the present invention is not limited to the above-described embodiments and examples, and various modifications can be made within a scope not departing from the spirit of the present invention.

The present application is based on Japanese Patent Application No. 2019-019856 filed on Feb. 6, 2019 and Japanese Patent Application No. 2020-006710 filed on Jan. 20, 2020, which contents are incorporated herein by reference.

What is claimed is:

1. A negative electrode active material for a lithium-ion battery, comprising a Si phase, a Si—Zr compound phase, and a Sn—X compound phase wherein the X is at least one element selected from the group consisting of Cu, Ti, Co, Fe, Ni, and Zr,
   wherein the Sn—X compound phase has a proportion of 0.1 mass % to 18 mass % to a whole,
   wherein the Si phase has a proportion of 10 mass % to 80 mass % to the whole, wherein the Si—Zr compound phase of an island form and the Sn—X compound phase are dispersed in the Si phase of a sea form,
   wherein the Si phase is a matrix phase, and
   wherein the Si—Zr compound phase comprises $Si_2Zr$ having a melting point higher than that of Si.

2. The negative electrode active material for a lithium-ion battery according to claim 1, wherein a maximum size of Si phase is 500 nm or less.

3. The negative electrode active material for a lithium-ion battery according to claim 1, wherein the Si phase has a proportion of 20 mass % to 65 mass % to the whole.

4. The negative electrode active material for a lithium-ion battery according to claim 1, wherein the Sn—X compound phase has a proportion of 1 mass % to 10 mass % to the whole.

5. The negative electrode active material for a lithium-ion battery according to claim 1, wherein X is at least one element selected from the group consisting of Cu, Ti, Co, and Zr.

6. The negative electrode active material for a lithium-ion battery according to claim 1, wherein X comprises Cu.

7. The negative electrode active material for a lithium-ion battery according to claim 1, wherein X comprises Zr.

8. The negative electrode active material for a lithium-ion battery according to claim 1, having an average particle diameter d50 of 1 µm to 20 µm.

9. A negative electrode for a lithium-ion battery, comprising:
   a conductive substrate; and
   a conductive film laminated on a surface of the conductive substrate,
   wherein the conductive film comprises the negative electrode active material described in claim 1 and a binder.

10. A lithium-ion battery, comprising:
    the negative electrode described in claim 9;
    a positive electrode; and
    an electrolyte comprising a lithium salt.

11. The negative electrode active material for a lithium-ion battery according to claim 1, wherein a content of Zr with respect to the whole negative electrode active material is 35.3 mass % or more.

12. A negative electrode active material for a lithium ion battery, comprising a Si phase, a Si—Zr compound phase, and a Sn—X compound phase wherein the X is at least one element selected from the group consisting of Cu, Ti, Co, Fe, Ni, and Zr,
    wherein the Sn—X compound phase has a proportion of 0.1 mass % to 18 mass % to a whole,
    wherein the Si phase has a proportion of 10 mass % to 80 mass % to the whole, wherein the Si—Zr compound phase and the Sn—X compound phase are dispersed in the Si phase,
    wherein the Si—Zr compound phase comprises $Si_2Zr$ having a melting point higher than that of Si.

* * * * *